3,132,138
PREPARATION OF 10β-ALLYL STEROIDS AND INTERMEDIATES
Gérard Nominé, Noisy-le-Sec, Robert Bucourt, Clichy-sous-Bois, and André Pierdet, Noisy-le-Sec, France, assignors to Roussel-UCLAF, S.A., Paris, France, a corporation of France
No Drawing. Filed Feb. 19, 1963, Ser. No. 259,747
Claims priority, application France Feb. 24, 1962
9 Claims. (Cl. 260—239.5)

The present invention relates to a new process of preparation of 10β-allyl steroids and the products obtained by this process. The present invention has more particularly for its object a new process of preparation of 10β-allyl-$\Delta^{4,9(11)}$-estradiene-17β-ol-3-one and its esters with organic carboxylic acids containing from 1 to 18 carbon atoms. These compounds are described in United States patent application Serial No. 83,381, filed January 18, 1961, now Patent No. 3,117,979.

As stated in co-pending United States patent application Serial No. 83,381, the said compounds are useful intermediates in steroidal synthesis, particularly in the production of 10β-allyl-19-nor-adrenosterone and 10β-allyl-19-nor cortisone. The process according to this patent application consists in ketalizing 17β-acyloxy-4,5-seco-$\Delta^9$-estrene-3,5-dione in the 3-position, subjecting the ketalized product to an allylation in the 10-position, transforming by hydrolysis the 3-monoketal of 17β-acyloxy-10β-allyl-4,5-seco-$\Delta^{9(11)}$-estrene-3,5-dione into 17β-acyloxy-10β-allyl-4,5-seco-$\Delta^{9(11)}$-estrene-3,5-dione and cyclizing this latter compound with saponification by the action of an alkaline base into the corresponding 10β-allyl-$\Delta^{4,9(11)}$-estradiene-17β-ol-3-one.

An object of the present invention is the development of a new process for the production of a 10β-allyl steroid of the formula

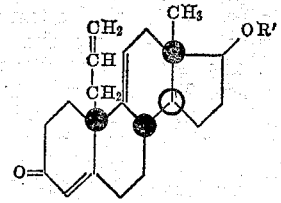

wherein R' is selected from the group consisting of hydrogen and the acyl radical of an organic carboxylic acid having from one to eighteen carbon atoms which comprises the steps of reacting a compound of the formula

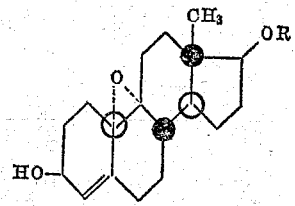

wherein R is selected from the group consisting of hydrogen and the acyl radical of an organic carboxylic acid having from one to seven carbon atoms, with an allyl magnesium halide in an inert organic solvent, oxidizing the 3β and 17β hydroxyl groups of the resultant 10β-allyl-$\Delta^4$-estrene-3β,9α,17β-triol by means of an oxidizing agent, subjecting the resultant 10β-allyl-$\Delta^4$-estrene-9α-ol-3,17-dione to the action of a dehydrating agent, blocking the 3 ketone group of the resultant 10β-allyl-$\Delta^{4,9(11)}$-estradiene-3,17-dione, subjecting the resultant steroid to the action of a reducing agent, freeing the blocked ketone in the 3-position and recovering said 10β-allyl steroid.

A further object of the invention is the production of the following intermediates:

10β-allyl-$\Delta^4$-estrene-3β,9α,17β-triol
10β-allyl-$\Delta^4$-estrene-9α-ol-3,17-dione
10β-allyl-$\Delta^{4,9(11)}$-estradiene-3,17-dione
3-pyrrolidyl-10β-allyl-$\Delta^{3,5,9(11)}$-estratriene-17-one
3-pyrrolidyl-10β-allyl-$\Delta^{3,5,9(11)}$-estratriene-17β-ol These and other objects of the invention will become more apparent as the description proceeds.

It has now been found that the allyl radical can be introduced with good yields into the 10β-position of a steroid by reaction of an allyl magnesium halide on the corresponding $\Delta^4$-9α,10α-epoxy derivative according to the following flow diagram (only partially shown):

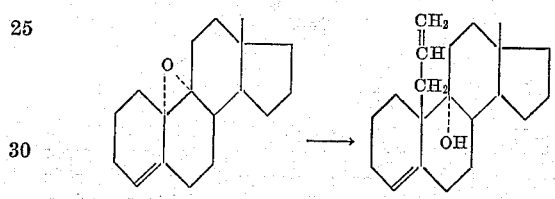

This reaction is unexpected as the magnesium salt of a saturated radical, for example, methyl magnesium iodide reacts under the same conditons to give an attack on the 4,5-double bond leading to the 4-methylated derivative.

It has been found in addition that it is possible to dehydrate a $\Delta^4$-3-keto-9α-hydroxy-10β-allylic derivative into the corresponding 9,11-dehydro compound despite the tendency toward retro-aldolization which characterizes this type of product (see particularly Bergstrom et al., Chem. and Ind., 1961, p. 1530).

The process of the invention consists essentially in that an allyl magnesium halide is made to react on 9α,10α-epoxy-$\Delta^4$-estrene-3β,17β-diol or the 17β-ester of a lower carboxylic acid of the latter (II). The resultant 10β-allyl-$\Delta^4$-estrene-3β,9α,17β-triol (III), is subjected to the action of an oxidizing agent to oxidize the 3β and 17β-hydroxyl functions. 10β-allyl-$\Delta^4$-estrene-9α-ol-3,17-dione (IV), is obtained which by the action of a dehydrating agent gives 10β-allyl-$\Delta^{4,9(11)}$-estradiene-3,17-dione (V). This compound is reduced, after having protected previously the ketone in the 3-position in the form of an enol ether or in the form of an enamine (VI), into the corresponding 17β-hydroxylated derivative (VII), then by freeing the ketone in the 3-position, 10β-allyl-$\Delta^{4,9(11)}$-estradiene-17β-ol-3-one (I), with R'=H, is obtained. This compound can be transformed, if desired, into any desired ester of compound I where R' represents the acyl radical of an organic carboxylic acid having from one to eighteen carbon atoms.

Table I is a flow diagram of the process of the invention.

TABLE I

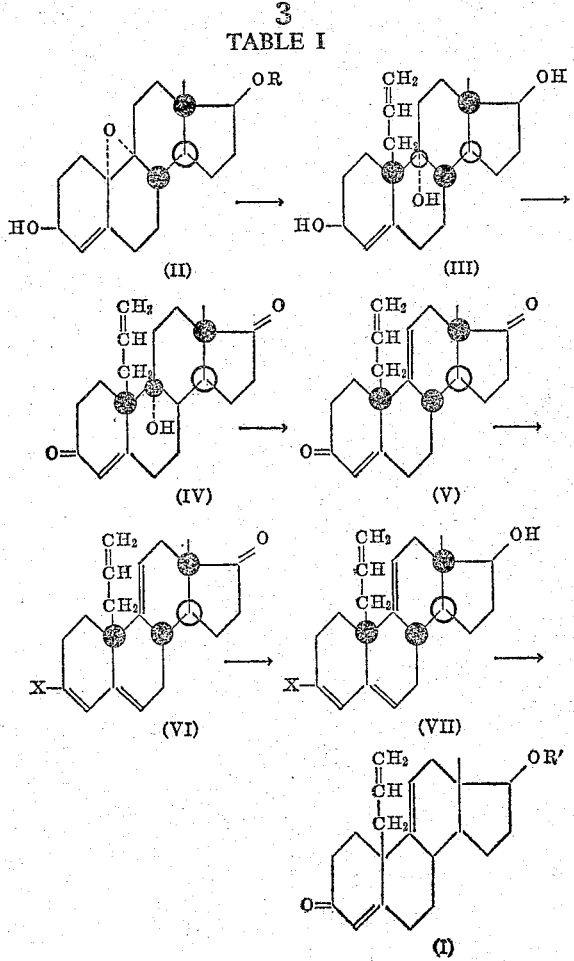

The aforesaid table—

R represents hydrogen or the acyl radical of an organic carboxylic acid having from one to seven carbon atoms;
R' represents hydrogen or the acyl radical of an organic carboxylic acid having from one to eighteen carbon atoms;
X represents lower alkoxy, benzyloxy or an enamine.

The acyl radicals of an organic carboxylic acid having 1 to 18 carbon atoms are those of aliphatic or cycloaliphatic, saturated or unsaturated carboxylic acids, or those of aromatic or heterocyclic carboxylic acids, for example, alkanoic acids, such as formic acid, acetic acid, propionic acid, butyric acid, isobutyric acid, valeric acid, isovaleric acid, trimethylacetic acid, caproic acid, β-trimethylpropionic acid, enanthic acid, caprylic acid, pelarginic acid, capric acid, undecyclic acid, lauric acid, myristic acid, palmitic acid, and stearic acid, alkenoic acids, such as undecylenic acid and oleic acid, cycloalkanoic acids, such as cyclopentyl-, cyclopropyl-, cyclobutyl-, and cyclohexylcarboxylic acids, cycloalkanealkanoic acids, such as cyclopropylmethylcarboxylic acid, cyclobutylmethylcarboxylic acid, cyclopentylethylcarboxylic acid, cyclohexylethylcarboxylic acid, aralkanoic acids, such as phenyl-acetic or propionic acids, benzoic acid, phenoxyalkanoic acids such as phenoxyacetic acid, p-chlorophenoxyacetic acid, 2,4-dichlorophenoxyacetic acid, 4-t-butylphenoxyacetic acid, 3-phenoxypropionic acid, 4-phenoxybutyric acid, furane-2-carboxylic acid, 5-t-butylfurane-2-carboxylic acid, 5-bromofurane-2-carboxylic acid, nicotinic acids, β-ketocarboxylic acids, for example, acetylacetic acid, propionylacetic acid, butyrylacetic acid, amino acids, such as diethylaminoacetic acid, aspartic acid, etc.

The introduction of the allyl group is effected by action of an allyl magnesium halide, preferably the bromide. The reaction takes place in an inert organic solvent such as tetrahydrofuran or ether at temperatures from room temperature up to the reflux temperature.

The oxidizing agent used in order to oxidize the 3β and 17β hydroxyl groups of 10β-allyl-Δ⁴-estrene-3β,9α,17β-triol (III) is preferably an aqueous solution of sulfuric and chromic acids. The reaction takes place in an inert water-miscible organic solvent such as acetone at about room temperature.

The hydroxyl group in the 9α-position of 10β-allyl-Δ⁴-estrene-9α-ol-3,17-dione (IV) is dehydrated preferably by the action of zinc chloride. The reaction takes place in an inert anhydrous organic solvent such as benzene at temperatures up to the reflux temperature.

The ketone function in the 3-position of 10β-allyl-Δ$^{4,9(11)}$-estradiene-3,17-dione (V) is protected, preferably, by the preparation of its enamine, 3-pyrrolidyl-10β-allyl-Δ$^{3,5,9(11)}$-estratriene-17-one (VI). The reaction takes place by heating compound V with pyrrolidine up to the refluxing temperature.

The ketone in the 17-position of 3-pyrrolidyl-10β-allyl-Δ$^{3,5,9(11)}$-estratriene-17-one (VI) is reduced, preferably, with the aid of a mixed metal hydride such as lithium aluminum hydride. The reaction takes place in an inert anhydrous organic solvent at temperatures up to the reflux temperature.

The ketone in the 3-position of 3-pyrrolidyl-10β-allyl-Δ$^{3,5,9(11)}$-estratriene-17β-ol (VII) is liberated, preferably by hydrolysis of the enamine in an aqueous media containing acidic methanol. The reaction takes place by heating water, methanol and an organic carboxylic acid such as acetic acid at temperatures up to the reflux temperature.

In the following examples there are illustrated several preferred embodiments to illustrate the invention. However, it should be understood that the invention is not intended to be limited to the specific embodiments.

Example I

PREPARATION OF 9α,10α-EPOXY-17β-BENZOYLOXY-Δ⁴-ESTRENE-3β-OL 4.4 grams of 9α,10α-epoxy-17β-benzoyloxy-Δ⁴-estrene-3-one having a melting point of 173° C. and a specific rotation $[\alpha]_D^{20} = +112°$ (c.=1% in methanol) (obtained according to the process described in U.S. Patent No. 3,055,885, issued September 25, 1962), were introduced into 18 cc. of tetrahydrofuran. 0.1 gram of sodium borohydride in 4 cc. of water was added under an atmosphere of nitrogen and the reaction mixture was agitated for a period of two hours at a temperature of 0°. The mixture was concentrated to a small volume under vacuum. 20 cc. of water were added and the mixture extracted with ether. The extracts, after washing with water and drying over sodium sulfate, furnished, after evaporation to dryness, 0.435 gram of raw 9α,10α-epoxy-17β-benzoyloxy-Δ⁴-estrene-3β-ol which was purified by recrystallization from methanol and ethyl acetate.

The purified product had a melting point of 204.5° and a specific rotation $[\alpha]_D^{20} = +116°$ (c.=0.5% in ethanol). The product occurred in the form of colorless prismatic needles, soluble in acetone, ethyl acetate and methanol.

*Analysis.*—$C_{25}H_{30}O_4$: Molecular weight=394.5. Calculated: C, 76.10%; H, 7.66%. Found: C, 76.0%; H, 7.5%.

Example II

PREPARATION OF 10β-ALLYL-Δ$^{4,9(11)}$-ESTRADIENE-17β-OL-3-ONE (I WITH R'=H)

*Step A—10β-allyl-Δ⁴-estrene-3β,9α,17β-triol (III).*—2.7 gm. of 9α,10α,-epoxy-17β-benzoyloxy-Δ⁴-estrene-3β-ol (II, R=COC₆H₅), prepared according to Example I, were dissolved in 27 cc. of tetrahydrofuran.

To the solution of compound II (R=COC₆H₅) 350 cc. of an ethereal solution of allyl magnesium bromide obtained starting from 20 gm. of magnesium and 40 gm. of allyl bromide were added while cooling slightly.

The reaction mixture was agitated for a peroid of a quarter of an hour. Then 400 cc. of benzene were added thereto. The mixture was heated gently in such a fashion as to evaporate the ether and next the reaction mixture was maintained for one hour at reflux under an atmosphere of nitrogen.

Thereafter the mixture was cooled in an ice bath and 300 cc. of an aqueous solution of ammonium chloride were added thereto. The cooled mixture was extracted with ethyl ether. The extract was washed with water, dried and evaporated to dryness under vacuum. 4.6 gm. of raw 10β-allyl-$\Delta^4$-estrene-3β,9α,17β-triol (III) were obtained.

The raw product was taken up with methylene chloride and passed through a column containing 135 gm. of magnesium silicate gel ("Florisil"). The column was eluted by a solution containing 20% of acetone in methylene chloride and 2.90 gm. of a product were obtained after evaporation of the solvent. The product was dissolved in 40 cc. of acetone. 4 cc. of boiling isopropyl ether were added thereto and the solution was allowed to stand overnight at 0° C.

The precipitate was vacuum filtered, washed with a mixture of acetone and isopropyl ether (1:1) and dried under vacuum.

1.10 gm. of 10β-allyl-$\Delta^4$-estrene-3β,9α,17β-triol (III) were obtained having a melting point of 180° C. and a specific rotation $[\alpha]_D^{20}=+95.2°$ (c.=0.57% in methanol). Yield: 49%.

This product is not described in the literature.

It occurs in the form of white needles, soluble in alcohol, acetone and ethyl acetate, insoluble in water and dilute aqueous acids and alkalis.

Analysis.—$C_{21}H_{32}O_3$: Molecular weight=332.47. Calculated: C, 75.85%; H, 9.70%. Found: C, 75.9%; H, 9.6%.

*Step B—10β-allyl-$\Delta^4$-estrene-9α-ol-3,17-dione (IV).—* 0.440 gm. of 10β-allyl-$\Delta^4$-estrene-3β,9α,17β-triol (III) was dissolved in 40 cc. of acetone and, while maintaining the interior temperature between 0 and +5° C., 2.4 cc. of a sulfochromic acid solution were introduced. This solution was prepared from 0.416 gm. of chromic acid, 0.4 cc. of pure sulfuric acid and 4 cc. of distilled water.

The reaction mixture was allowed to stand next for a period of 3 hours under agitation at room temperature. Thereafter, it was taken up with water and extracted with methylene chloride. The extracts were washed with an aqueous solution of sodium bicarbonate, then with water, dried over sodium sulfate and concentrated to dryness under vacuum.

0.424 gm. of raw product was obtained which was dissolved in 4 cc. of methanol. The solution was concentrated to a volume of 2 cc. under an atmosphere of nitrogen and held overnight at 0° C.

The precipitate obtained was vacuum filtered, washed with methanol and dried under vacuum. 0.354 gm. of 10β-allyl-$\Delta$4-estrene-9α-ol-3,17-dione (IV) was obtained having a melting point of 200° C. and a specific rotation $[\alpha]_D^{20}=+135.5°$ (c.=0.5% in methanol). Yield: 81.5%.

This product is not described in the literature.

It occurs in the form of white prisms, soluble in acetone and chloroform, and insoluble in water, dilute aqueous acids and alkalis and isopropyl ether.

Analysis.—$C_{21}H_{28}O_3$: Molecular weight=328.43. Calculated: C, 76.79%; H, 8.59%. Found: C, 76.8%; H, 8.4%.

*Step C—10β-allyl-$\Delta^{4,9(11)}$-estradiene-3,17-dione (V).—* 0.300 gm. of 10β-allyl-$\Delta^4$-estrene-9α-ol-3,17-dione (IV) was dissolved in 35 cc. of anhydrous benzene and 1.2 gm. of pure zinc chloride were added thereto. The reaction mixture was heated to reflux for a period of 2 hours while agitating under an atmosphere of nitrogen. Thereafter, it was cooled to room temperature and taken up in sufficient water to dissolve the zinc chloride.

The solution was decanted and the aqueous phase extracted with methylene chloride. The organic phases were combined, washed with water, dried over sodium sulfate and evaporated to dryness under vacuum.

0.290 gm. of raw product was obtained which was taken up with 3 cc. of methylene chloride and passed through a column containing 30 gm. of magnesium silicate gel.

The column was eluted by a solution containing 1% of acetone in methylene chloride. The eluate was evaporated to dryness in a vacuum and 0.25 gm. of a product was obtained which was dissolved in 1 cc. of boiling isopropyl ether. The solution was allowed to stand overnight at 0° C. The precipitate was vacuum filtered, washed with isopropyl ether and dried under vacuum.

0.220 gm. of 10β - allyl - $\Delta^{4,9(11)}$-estradiene-3,17-dione (V) was obtained having a melting point of 120°–121° C. and a specific rotation $[\alpha]_D^{20}=+216°$ (c.=0.3% in ethanol). Yield: 78%.

The product occurred in the form of prismatic white crystals soluble in alcohol, benzene and chloroform, slightly soluble in isopropyl ether and insoluble in water, and dilute aqueous acids and alkalis.

*Step D—10β-allyl - $\Delta^{4,9(11)}$ - estradiene-17β-ol-3-one (I, with R′=H).—* 0.2 gm. of 10β-allyl-$\Delta^{4,9(11)}$-estradiene-3,17-dione (V) and 0.6 cc. of pyrrolidine were heated for a period of 15 minutes at 85° C. under an atmosphere of nitrogen. The mixture was cooled to about +5° to +10° C. and 3 cc. of methanol were added. After holding the mixture 30 minutes at +5° C., the precipitate was vacuum filtered and washed with methanol, 3-pyrrolidyl-10β-allyl-$\Delta^{3,5,9(11)}$-estratriene-17-one was obtained.

0.100 gm. of 3-pyrrolidyl-10β-allyl-$\Delta^{3,5,9(11)}$-estratriene-17-one in 5 cc. of dry ethyl ether, free of peroxides, was heated to reflux for a period of one hour with 0.100 gm. of lithium aluminum hydride. The reaction mixture was cooled, diluted with iced water and extracted with ethyl ether. The alumina was removed by filtering through diatomaceous earth. The extract was washed until neutral and distilled to dryness. 3-pyrrolidyl-10β-allyl$^{3,5,9(11)}$-estratriene-17β-ol was recovered.

3-pyrrolidyl-10β-allyl-$\Delta^{3,5,9(11)}$-estratriene-17β - ol was hydrolyzed by heating to reflux for a period of 4 hours under nitrogen in a bath as follows:

| | |
|---|---|
| Methanol _____cc____ | 2 |
| Acetic acid _____cc____ | 0.2 |
| Water _____cc____ | 0.3 |
| Sodium acetate _____gm____ | 0.3 |

The methanol was removed under vacuum. The product was diluted with water, extracted and the extract distilled to dryness.

10β-allyl-$\Delta^{4,9(11)}$-estradiene-17β-ol-3-one (I, with R′=H) was obtained having a melting point of 128—130° C. and a specific rotation $[\alpha]_D^{20}=+105°$ (c.=0.5% in ethanol).

The product is soluble in ethanol, acetone, benzene and chloroform, slightly soluble in ether and insoluble in water.

By esterification of 10β-allyl-$\Delta^{4,9(11)}$-estradiene-17β-ol-3-one by means of a functional derivative of one of the acids enumerated above such as, for purposes of illustration only, the chloride of benzoic acid in the presence of a base, such as pyridine, the corresponding 17β-benzoyloxy-10β-allyl-$\Delta^{4,9(11)}$-estradiene-3-one (I, with R′=$COC_6H_5$)

was obtained. Obviously other esters of the acids enumerated above can be obtained by this or other known processes of esterification.

It is to be understood that the invention is not limited to the specific examples described above. One can use equivalent techniques known to the man skilled in the art without departing from the body of the invention or the scope of the appended claims.

We claim:
1. A process for the production of a 10β-allyl steroid of the formula

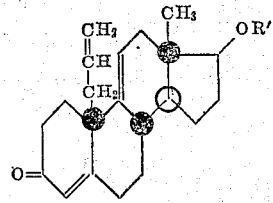

wherein R' is selected from the group consisting of hydrogen and the acyl radical of an organic carboxylic acid having from one to eighteen carbon atoms which comprises the steps of reacting a compound of the formula

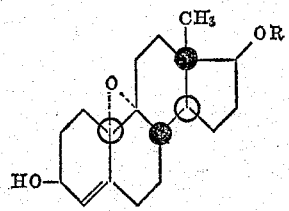

wherein R is selected from the group consisting of hydrogen and the acyl radical of an organic carboxylic acid having from one to seven carbon atoms, with an allyl magnesium halide in an inert organic solvent, subjecting the 10β-allyl-Δ⁴-estrene-3β,9α,17β-triol to the action of an aqueous solution of sulfuric and chromic acids in the presence of an inert water-miscible organic solvent, reacting the 10β-allyl-Δ⁴-estrene-9α-ol-3,17-dione with zinc chloride in an inert anhydrous organic solvent, reacting the 10β-allyl-Δ⁴,⁹⁽¹¹⁾-estradiene-3,17-dione with pyrrolidine, subjecting the 3-pyrrolidyl-10β-allyl-Δ³,⁵,⁹⁽¹¹⁾-estratriene-17-one to the action of a mixed metal hydride, hydrolyzing the 3-pyrrolidyl-10β-allyl-Δ³,⁵,⁹⁽¹¹⁾-estratriene-17β-ol by the action of an aqueous acidic solution and recovering said 10β-allyl steroid.

2. The process of claim 1 wherein said allyl magnesium halide is allyl magnesium bromide.

3. The process of producing 10β-allyl-Δ⁴-estrene-3β,9α,17β-triol which comprises the steps of reacting a compound of the formula

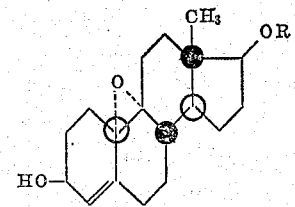

wherein R is selected from the group consisting of hydrogen and the acyl radical of an organic carboxylic acid having from one to seven carbon atoms, with an allyl magnesium halide in an inert organic solvent, and recovering said 10β-allyl-Δ⁴-estrene-3β,9α,17β-triol.

4. The process of producing 10β-allyl-Δ⁴,⁹⁽¹¹⁾-estradiene-3,17-dione which comprises the steps of dehydrating 10β-allyl-Δ⁴-estrene-9α-ol-3,17-dione by the action of zinc chloride in an inert anhydrous organic solvent and recovering said 10β-allyl-Δ⁴,⁹⁽¹¹⁾-estradiene-3,17-dione.

5. 10β-allyl-Δ⁴-estrene-3β,9α,17β-triol.
6. 10β-allyl-Δ⁴-estrene-9α-ol-3,17-dione.
7. 10β-allyl-Δ⁴,⁹⁽¹¹⁾-estradiene-3,17-dione.
8. 3-pyrrolidyl-10β-allyl-Δ³,⁵,⁹⁽¹¹⁾-estratriene-17-one.
9. 3-pyrrolidyl-10β-allyl-Δ³,⁵,⁹⁽¹¹⁾-estratriene-17β-ol.

No references cited.